(12) United States Patent
Seok

(10) Patent No.: US 9,578,655 B2
(45) Date of Patent: Feb. 21, 2017

(54) METHOD AND APPARATUS FOR ACCESSING CHANNEL IN WLAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 14/394,928

(22) PCT Filed: Apr. 29, 2013

(86) PCT No.: PCT/KR2013/003659
§ 371 (c)(1),
(2) Date: Oct. 16, 2014

(87) PCT Pub. No.: WO2013/162338
PCT Pub. Date: Oct. 31, 2013

(65) Prior Publication Data
US 2015/0071211 A1    Mar. 12, 2015

Related U.S. Application Data

(60) Provisional application No. 61/680,227, filed on Aug. 6, 2012, provisional application No. 61/651,002, filed
(Continued)

(51) Int. Cl.
*H04W 4/00* (2009.01)
*H04W 74/04* (2009.01)
(Continued)

(52) U.S. Cl.
CPC ......... *H04W 74/04* (2013.01); *H04W 52/0216* (2013.01); *H04W 74/006* (2013.01); *H04W 84/12* (2013.01); *Y02B 60/50* (2013.01)

(58) Field of Classification Search
CPC ................. H04W 4/003; H04W 8/26; H04W 84/18–84/22;H04W 74/04; H04W 48/08; H04L 65/1059; H04L 65/1013; H04M 1/2473; H04M 7/0036
(Continued)

(56) References Cited

U.S. PATENT DOCUMENTS 6,529,497 B1   3/2003 Hjelm et al.
7,599,296 B2   10/2009 Tartarelli et al.
(Continued)

FOREIGN PATENT DOCUMENTS

EP         1684465 A1    7/2006
JP      2010519875 A    6/2010
(Continued)

OTHER PUBLICATIONS

"Supporting Low Power Operation", IEEE 802.11-12/0409r2, S. Zheng et al., Mar. 13, 2012.
(Continued)

*Primary Examiner* — Iqbal Zaidi
(74) *Attorney, Agent, or Firm* — Dentons US LLP

(57) ABSTRACT

The present invention relates to a wireless communication system, and more specifically, disclosed are a method and an apparatus for accessing a channel in a WLAN system. The method for accessing a channel from a station (STA) in a wireless communication system, according to one embodiment of the present invention, comprises the steps of: receiving from an access point (AP) a first frame including a traffic indication map (TIM) and a restricted access window (RAW) parameter set component; determining a RAW in which channel access of the STA is permitted, on the basis of the RAW parameter set (RPS) component; and transmitting a second frame to the AP from within the RAW that is determined, wherein the RAW includes at least one slot, the RPS component includes at least one RAW allocation field, each of the at least one RAW allocation field includes a
(Continued)

RAW duration field and a slot duration field, and wherein an index of a slot which is allocated to the STA can be determined on the basis of an association identifier (AID) of the STA and the number of the slots in the RAW.

14 Claims, 15 Drawing Sheets

Related U.S. Application Data on May 24, 2012, provisional application No. 61/639,877, filed on Apr. 28, 2012.

(51) Int. Cl.
*H04W 52/02* (2009.01)
*H04W 74/00* (2009.01)
*H04W 84/12* (2009.01)

(58) Field of Classification Search
USPC .................................................. 370/230–339
See application file for complete search history.

(56) References Cited

U.S. PATENT DOCUMENTS

| | | | |
|---|---|---|---|
| 7,876,704 | B1 | 1/2011 | Bims et al. |
| 8,018,882 | B1 | 9/2011 | Chhabra |
| 9,155,027 | B1* | 10/2015 | Liu ..................... H04W 74/006 |
| 2003/0198244 | A1 | 10/2003 | Ho et al. |
| 2004/0253996 | A1 | 12/2004 | Chen et al. |
| 2005/0047386 | A1 | 3/2005 | Yi |
| 2005/0050246 | A1 | 3/2005 | Lakkakorpi et al. |
| 2010/0189021 | A1 | 7/2010 | He et al. |
| 2010/0214942 | A1 | 8/2010 | Du et al. |
| 2011/0170559 | A1 | 7/2011 | Zhang et al. |
| 2011/0305216 | A1 | 12/2011 | Seok |
| 2013/0229959 | A1* | 9/2013 | Ghosh ................... H04W 74/08 370/311 |
| 2014/0254361 | A1* | 9/2014 | Koskela ................ H04W 36/22 370/230 |

FOREIGN PATENT DOCUMENTS

| | | |
|---|---|---|
| JP | 2015502111 A | 1/2015 |
| KR | 10-2009-0030295 A | 3/2009 |
| KR | 10-2009-0131398 A | 12/2009 |
| RU | 2286030 C1 | 10/2006 |
| RU | 2437234 C2 | 12/2011 |
| WO | 2006025680 A1 | 3/2006 |
| WO | 2009/062185 A2 | 5/2009 |
| WO | 2011/149271 A2 | 12/2011 |
| WO | 2011/149285 A2 | 12/2011 |
| WO | 2012/053841 A2 | 4/2012 |

OTHER PUBLICATIONS

Nokia: "Group Synchronized DCF", IEEE 802.11-12/0329r1, Mar. 12, 2012.

"Uplink Channel Access General Procedure", IEEE 802.11-12/0831r0, Y. Seok, LG Electronics, Jul. 12, 2012.

"Supporting Low Power Operation", IEEE802.11-12/0409r2, S. Zheng et al., Mar. 13, 2012.

Perez-Costa, Xavier et al., "Analysis of the Integration of IEEE 802.11E Capabilities in Battery Limited Mobile Devices", IEEE Wireless communications, Dec. 2005.

* cited by examiner

METHOD AND APPARATUS FOR ACCESSING CHANNEL IN WLAN SYSTEM

This application is a 35 USC §371 National Stage entry of International Application No. PCT/KR2013/003659, filed Apr. 29, 2013, and claims priority to U.S. Provisional Application No. 61/680,227 filed Aug. 6, 2012, 61/651,002 filed May 24, 2012, and 61/639,877 filed Apr. 28, 2012, all of which are hereby incorporated by reference in its entirety.

TECHNICAL FIELD

The present invention relates to a wireless communication system and, more particularly, to a method and apparatus for accessing a channel in a WLAN system.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input and Multiple Output (MIMO) technology, which employs multiple antennas for both a transmitter and a receiver in order to minimize transmission errors and to optimize data rate, has been introduced.

DISCLOSURE

Technical Problem

Machine-to-machine (M2M) communication technology has been discussed as a next generation communication technology. Technical standard to support M2M communications in the IEEE 802.11 WLAN system is also under development as IEEE 802.11ah. In M2M communications, a scenario in which occasional transmission/reception of a small amount of data at a low speed in an environment including a large number of devices may be considered.

Communication in the WLAN system is performed on a medium shared by all devices. If the number of devices increases as in the case of M2M communication, consumption of a lot of time for channel access of one device may deteriorate overall system performance and obstruct each device from saving power.

An object of the present invention devised to solve the problem lies in a new channel access method for reducing time taken for channel access and lowering power consumption of a device.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for performing channel access in at least one station (STA) of a wireless communication system, including receiving, from an access point (AP), a first frame containing a traffic indication map (TIM) element and a restricted access window (RAW) parameter set element, determining an RAW allowing channel access of the STA based on the RAW parameter set (RPS) element, and transmitting a second frame to the AP within the determined RAW, wherein the RAW includes at least one slot, and the RPS element includes at least one RAW assignment field, each of the at least one RAW assignment field including a RAW duration field and a slot duration field, and wherein an index of a slot assigned to the STA is determined based on an association identifier (AID) of the STA and the number of slots in the RAW.

In another aspect of the present invention, provided herein is a station (STA) for performing channel access in a wireless communication system, including a transceiver, and a processor, wherein the processor is configured to receive, from an access point, a first frame containing a traffic indication map (TIM) element and a restricted access window (RAW) parameter set element using the transceiver, determine an RAW allowing channel access of the STA based on the RAW parameter set (RPS) element, and transmit a second frame to an access point (AP) within the determined RAW using the transceiver, wherein the RAW includes at least one slot, and the RPS element includes at least one RAW assignment field, each of the at least one RAW assignment field including a RAW duration field and a slot duration field, and wherein an index of a slot assigned to the STA is determined based on an association identifier (AID) of the STA and the number of slots in the RAW.

Embodiments according to the above aspects of the present invention may include the following details in common.

The index ($i_{slot}$) of the slot may be determined based on the following equation: $i_{slot}=f(AID) \bmod N_{RAW}$, wherein f(AID) may have a value determined based on the AID, $N_{RAW}$ may denote the number of slots, and mod may denote modulo operation.

$N_{RAW}=T_{RAW}/T_{slot}$, wherein $T_{RAW}$ may be determined by a value of the RAW duration field, and $T_{slot}$ is determined by the slot duration field.

Each of the at least one RAW assignment field may further include a field indicating whether or not the channel access is restricted to paged STAs only, wherein, when the field indicates that the channel access is restricted to the paged STAs only, f(AID) may be determined based on a position index of an AID bit in the TIM element.

When the field does not indicate that the channel access is restricted to the paged STAs only, f(AID) may be determined based on the AID of the STA.

The slot duration field may indicate a duration of the at least one slot having the same value within the RAW.

Each of the at least one RAW assignment field may further include a RAW group field and a RAW start time field.

The RAW group field may indicate AIDs of STAs allowed to perform channel access within the RAW.

Whether or not the STA belongs to a group indicated by the RAW group field may be determined.

Each of the at least one RAW assignment field may further include a cross slot boundary field.

The cross slot boundary field may indicate whether or not the transmission by the STA is allowed to cross a slot boundary.

The STA may operate in a doze state before a time, and switch to an awake state at the time, the channel access within the RAW being allowed at the time.

The first frame may be a beacon frame, and the second frame may be a power save (PS)-Poll frame or a trigger frame.

The second frame may be transmitted within the RAW based on enhanced distributed channel access (EDCA).

The above general description and following detailed description of the present invention are exemplarily given to supplement the recitations in the claims.

Advantageous Effects

According to one embodiment of the present invention, a new channel access method and apparatus for reducing time taken for channel access and lowering power consumption of a device may be provided.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention.

BEST MODE

Figure 1:
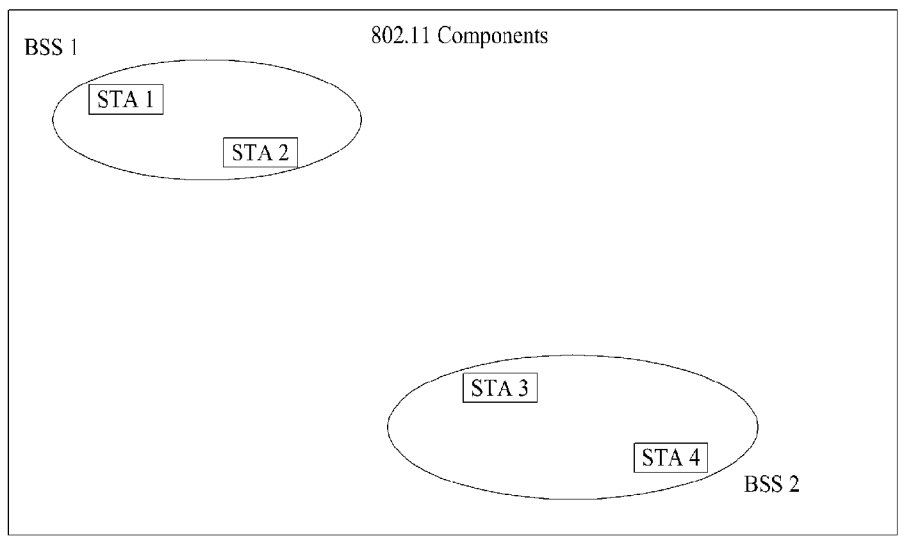
FIG. 1 is a diagram showing an exemplary structure of an IEEE 802.11 system to which the present invention is applicable.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that can be implemented according to the invention. The following detailed description includes specific details in order to provide a thorough understanding of the present invention. However, it will be apparent to those skilled in the art that the present invention may be practiced without such specific details.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment.

Specific terms are employed in the following description for better understanding of the present invention. Such specific terms may take other forms within the technical scope or spirit of the present invention.

In some cases, well-known structures and devices are omitted in order to avoid obscuring the concepts of the present invention and important functions of the structures and devices may be mainly illustrated in the form of block diagrams. Wherever possible, the same reference numbers will be used throughout the drawings to refer to the same parts.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802.20, and E-UTRA (Evolved UTRA). For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof(i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may take a minimized form consisting of two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 2:
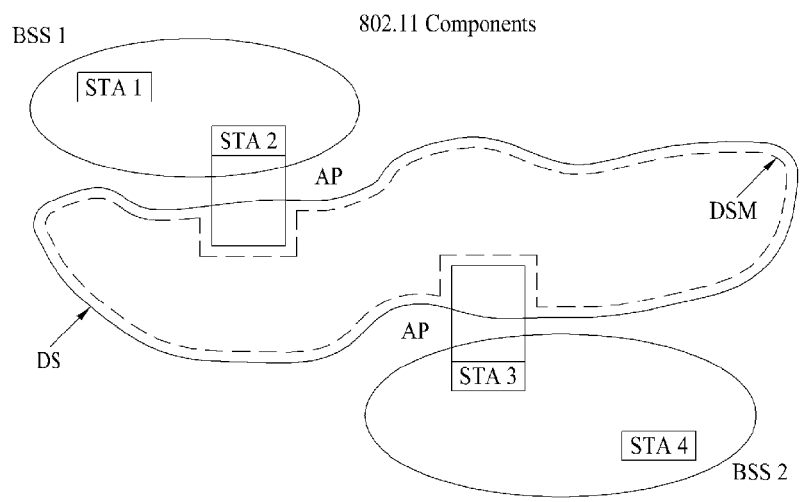
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited by physical layer (PHY) performance. In some cases, such limited distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. Once the controlled port is authenticated, data (or frames) may be transmitted to the DS.

Figure 3:
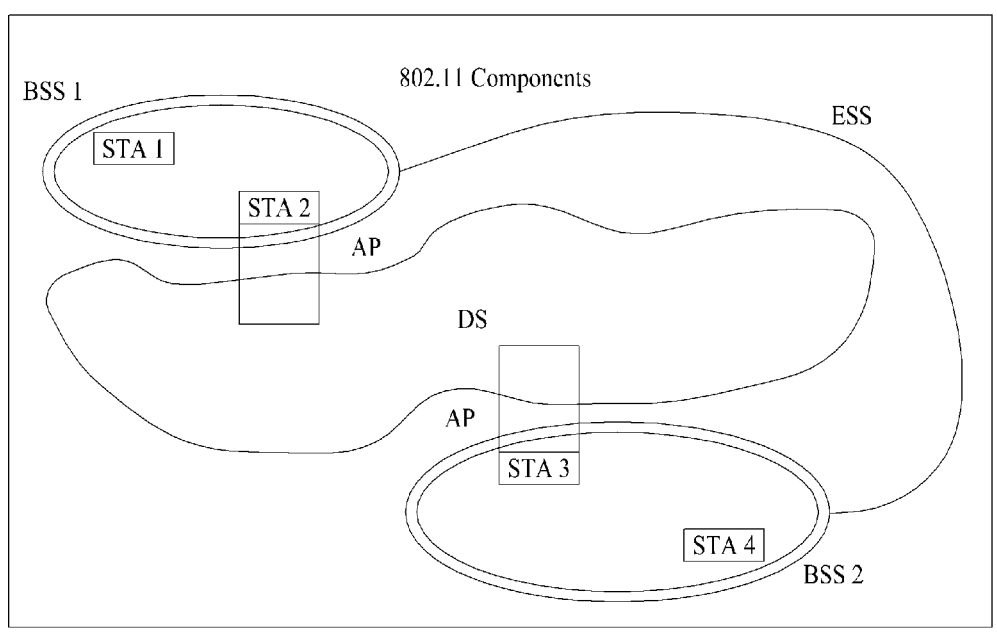
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

Regarding relative physical locations of the BSSs in FIG. 3, IEEE 802.11 does not assume any arrangement, and all the following arrangements are possible. BSSs may partially overlap and this positional arrangement is generally used to provide continuous coverage. In addition, the BSSs may not be physically connected, and a distance between BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed at the same location.

Figure 4:
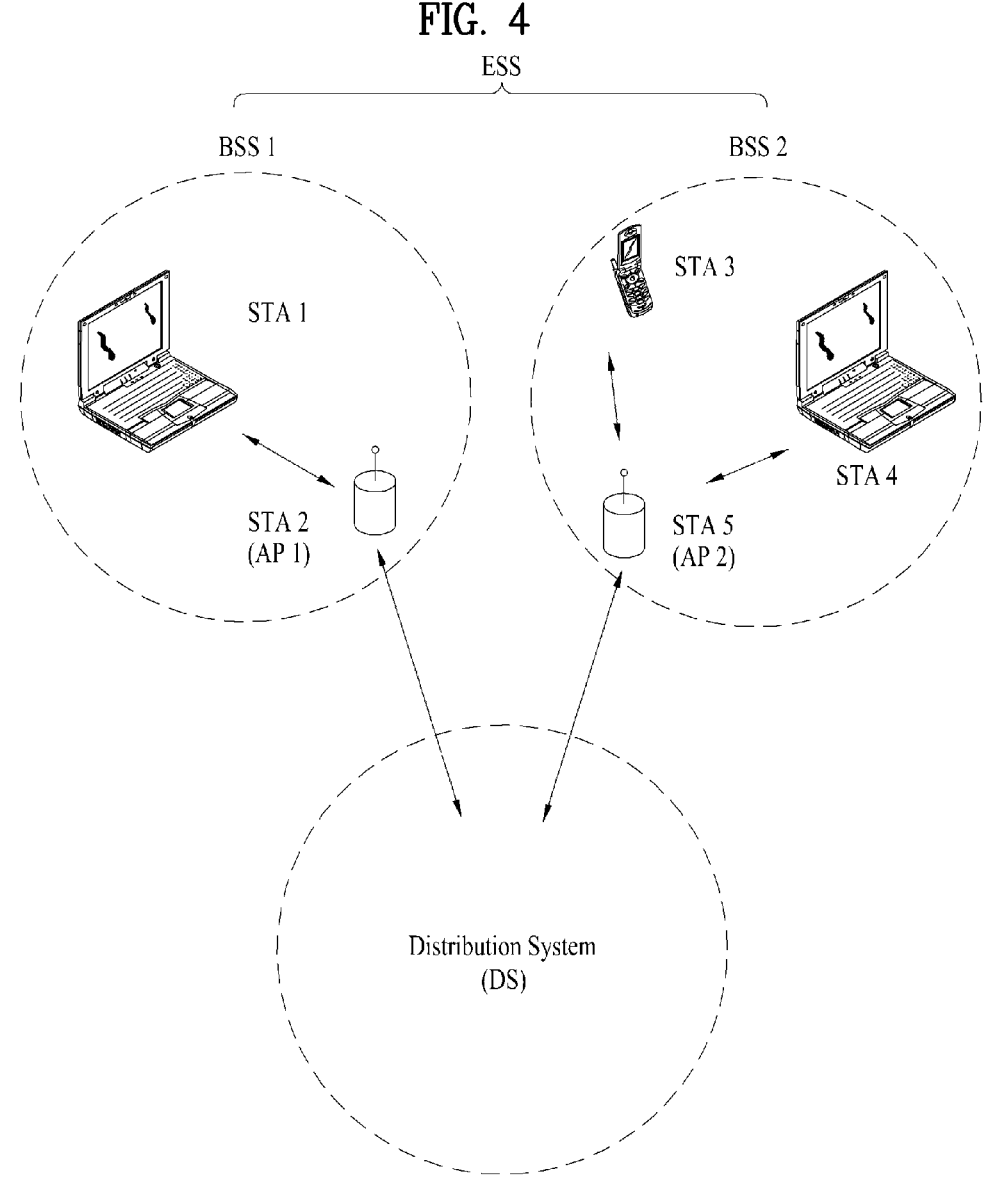
FIG. 4 is a diagram showing an exemplary structure of a WLAN system.

FIG. 4 is a diagram showing an exemplary structure of a WLAN system. FIG. 4 shows an exemplary infrastructure BSS including a DS.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA 1, STA 3, and STA 4 correspond to the non-AP STAs and STA 2 and STA 5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Link Setup Process

Figure 5:
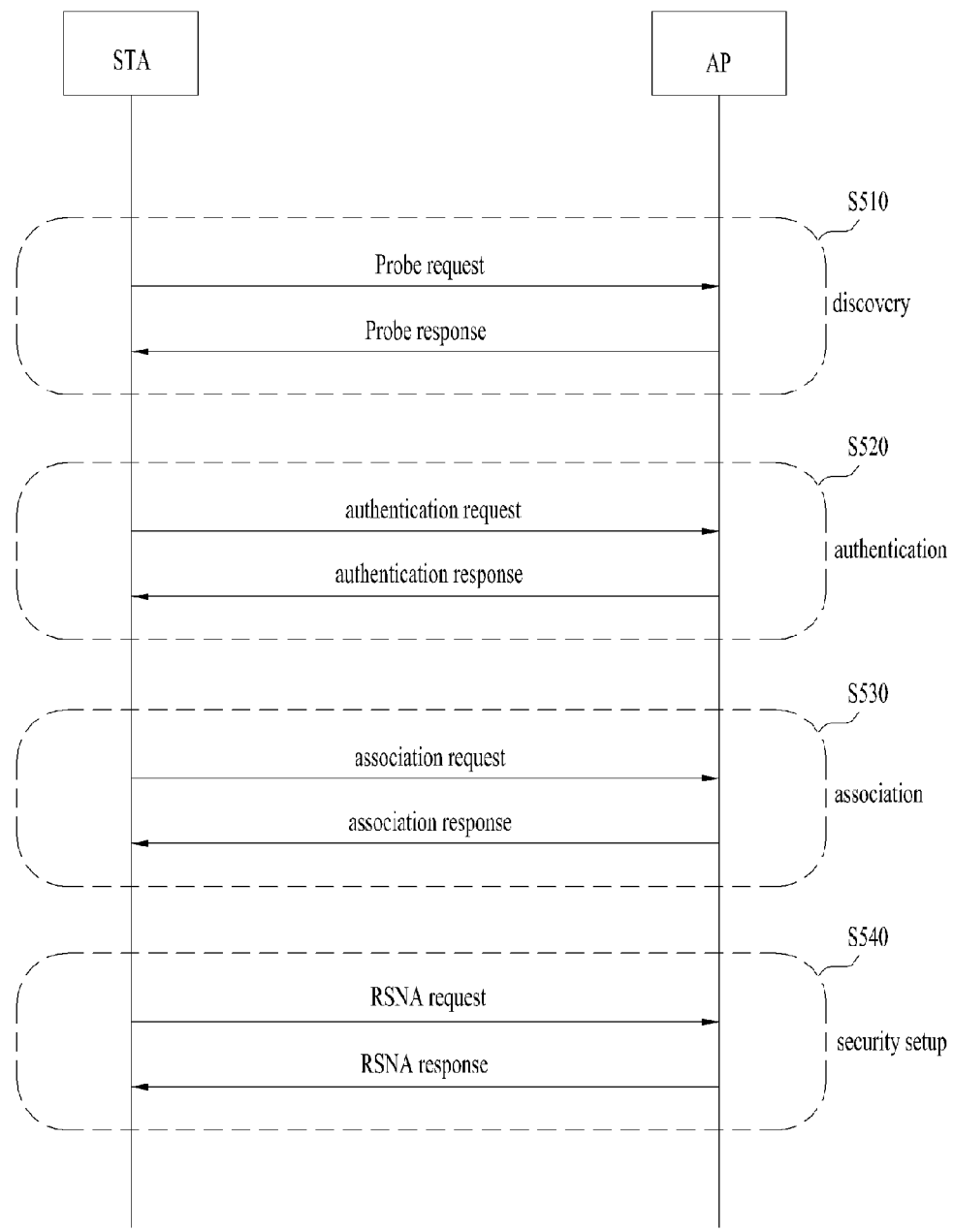
FIG. 5 illustrates a link setup process in a WLAN system.

FIG. 5 illustrates a general link setup process.

To set up a link with respect to the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 5.

In step S510, an STA may perform the network discovery operation. The network discovery operation may include a scanning operation of the STA. That is, the STA needs to search for an available network so as to access the network. The STA needs to identify a compatible network before participating in a wireless network. Herein, the process of identifying a network contained in a specific region is referred to as scanning.

The scanning operation is classified into active scanning and passive scanning.

FIG. 5 exemplarily shows the network discovery operation including the active scanning process. In the case of active scanning, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a BSS of the scanned channel. In the BSS, the AP transmits a beacon frame, and thus the AP serves as the responder. In the IBSS, STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (i.e., transmission/reception of a probe request/response on Channel #2) in the same manner.

Although not shown in FIG. 5, scanning may be carried out in the passive scanning manner. In performing the passive scanning operation, an STA to perform scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network. In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication, which is clearly distinguished from the security setup operation of step S540, which will be described later.

The authentication process may include transmitting, by the STA, an authentication request frame to an AP and transmitting, by the AP, an authentication response frame to the STA in response to the authentication request frame. The authentication frame used in transmitting an authentication request/response may correspond to a management frame.

The authentication frame may contain information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include the steps of transmitting, by the STA, an association request frame to the AP and transmitting, by the AP, an association response frame to the STA in response.

For example, the association request frame may include information related to various capabilities, a beacon listening interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a process of performing private key setup based on 4-way handshaking through an extensible authentication protocol over LAN (EAPOL) frame. In addition, the security setup process may be performed using another security scheme that is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend wireless network coverage. More specifically, IEEE 802.11n supports a high throughput (HT) of a maximum data processing speed of 540 Mbps, and is based on multiple input multiple output (MIMO) technology in which multiple antennas are used at both a transmitter and a receiver.

With widespread use of WLAN technology and diversification of WLAN applications, there has been a need for development of a new WLAN system capable of supporting higher throughput than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at a MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA.

In addition, technology for supporting WLAN system operations in whitespace is under discussion. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA need to pre-check whether use of a specific frequency band within the WS band is possible, namely whether a licensed user is operating in the frequency band. Checking whether a licensed user is operating in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As examples of communication between a device and an application server there are; communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). In addition, in M2M communication, an operation of an STA is performed according to a command provided on downlink (i.e., a link from an AP to a non-AP STA), and as a result data is reported on uplink (i.e., a link from the non-AP STA to the AP). Accordingly, an improved communication scheme on uplink for transmission of major data is mainly handled in M2M communication. Further, an M2M STA usually operates using a battery and it is often difficult for a user to frequently charge the battery. Accordingly, it is required to ensure a long service life by minimizing battery consumption. Moreover, it is expected that it will be difficult for a user to directly manipulate the M2M STA in a specific situation, and therefore the M2M STA is required to have a function of self-recovery. Accordingly, methods have been discussed to efficiently support the case in which a very small number of STAs have a data frame to receive from the AP during one beacon period while the number of STAs to be associated with one AP increases in the WLAN system and to lower power consumption of the STAs.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

WLAN Operating Below 1 GHz (in Sub-1 GHz)

As described above, IEEE 802.11ah standard which takes M2M communication into consideration as use cases is under discussion. IEEE 802.11ah standard may operate in an unlicensed band of frequencies below 1 GHz (sub-1 GHz) except the TV white space band, and have even larger coverage (e.g., up to 1 km) than existing WLAN which mainly provides indoor coverage. That is, when WLAN is used in a band of sub-1 GHz operating frequencies (e.g., 700 MHz to 900 MHz) rather than at a frequency of 2.4 GHz or 5 GHz at which WLAN has conventionally operated, coverage of an AP increases by about two to three times at the same transmission power due to the propagation characteristics of this band. In this case, a large number of STAs per AP may be allowed to perform access. Use cases considered in IEEE 802.11ah standard are summarized in Table 1 below.

TABLE 1

Use Case 1: Sensors and meters

1a: Smart Grid - Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and meter data Backhaul aggregation of sensors
Backhaul aggregation of industrial sensors
Use Case 3: Extended range Wi-Fi Outdoor extended range hotspot
Outdoor Wi-Fi for cellular traffic offloading According to Use Case 1 in Table 1, various kinds of sensors/meters may access an 802.11ah AP to perform M2M communication. Particularly, a smart grid allows up to 6000 sensors/meters to access one AP.

According to Use Case 2 in Table 1, the 802.11ah AP providing wide coverage serves as a backhaul link for other systems such as IEEE 802.15.4g.

According to Use Case 3 in Table 1, outdoor extended range hotspot communication may be supported in the outdoor extended range including extended home coverage, campus wide coverage, and shopping malls. In addition, in Use Case 3, the 802.11ah AP may serve to reduce overload of cellular traffic by supporting traffic offloading of cellular mobile communication.

Configuration of a physical layer (PHY) for communication in the sub-1 GHz band as described above may be implemented by applying 1/10 down-clocking on the existing IEEE 802.11ac PHY. In this case, 20/40/80/160/80+80 MHz channel bandwidths in 802.11ac may provide, through 1/10 down-clocking, 2/4/8/16/8+8 MHz channel bandwidths in the sub-1 GHz band. Thereby, a guard interval (GI) may increase from 0.8 μs by 10 times to 8 μs. In Table 2 below, throughput of the 802.11ac PHY is compared with that of the sub-1 GHz PHY.

TABLE 2

| IEEE 802.11ac PHY Channel Bandwidth/Throughput | 1/10 down-clocked sub-1GH PHY Channel Bandwidth/Throughput |
|---|---|
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS)), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
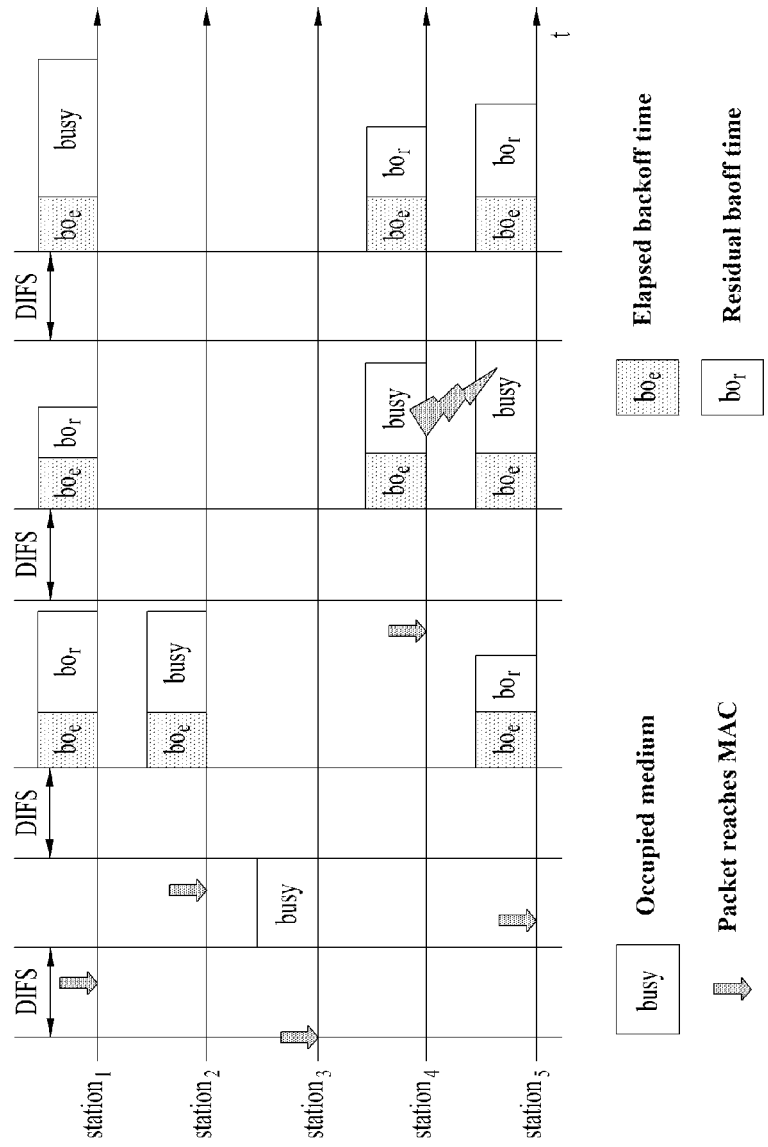
FIG. 6 illustrates a backoff process.

FIG. 6 illustrates a backoff process.

Hereinafter, operations based on a random backoff period will be described with reference to FIG. 6. If the medium is switched from the occupied or busy state to the idle state, several STAs may attempt to transmit data (or frames). In a method to minimize collision, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to 2n−1 (where n=0, 1, 2, . . . ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown resumes.

In the example shown in FIG. 6, if a packet for STA3 to transmit reaches MAC of STA3, STA3 may confirm that the medium is in the idle state in the DIFS and immediately transmit a frame. In the meantime, the other STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the lowest backoff count value and STA1 selects the highest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, neither STA4 nor STA5 receives ACK and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only physical carrier sensing through which the AP and/or STA directly sense the medium, but also virtual carrier sensing. The virtual carrier sensing is performed to address some problems (such as a hidden node problem) encountered in medium access. In virtual carrier sensing, MAC of the WLAN system may use a network allocation vector (NAV). By means of the NAV value, the AP and/or STA which is using the medium or has authority to use the medium indicates, for another AP and/or another STA, the remaining time before a time at which the medium becomes available. Accordingly, the NAV value may correspond to a reserved period during which the medium is used by the AP and/or STA to transmit a frame. Access of an STA having received the NAV value may be prohibited or deferred during the corresponding period. NAV may be set according to, for example, the value of the duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
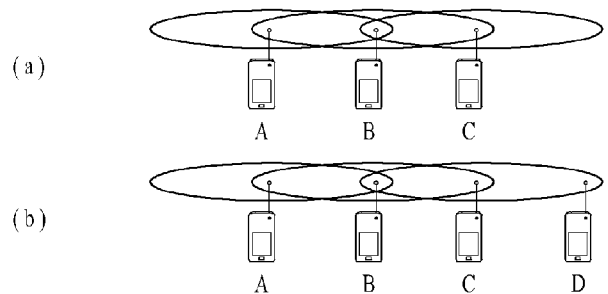
FIG. 7 illustrates a hidden node and an exposed node.

FIG. 7 illustrates a hidden node and an exposed node.

FIG. 7(*a*) exemplarily shows a hidden node. In FIG. 7(*a*), STA A communicates with STA B, and STA C has information to be transmitted. Specifically, when STA C performs carrier sensing prior to transmission of data to STA B, STA C may determine that the medium is in the idle state even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

Figure 13:
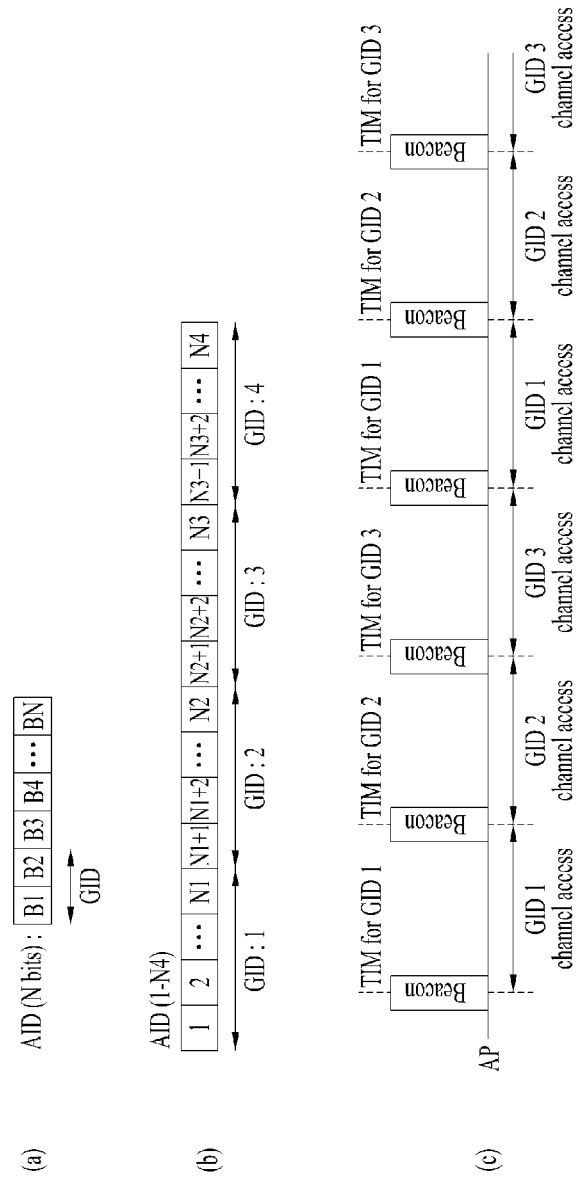
FIG. 13 illustrates a group-based AID.

FIG. 7(*b*) exemplarily shows an exposed node. In FIG. 13(*b*), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium switches back to the idle state since the occupied state of the medium is sensed. However, since STA A is actually located out of the transmission range of STA C, transmission from STA C may not collide with transmission from STA B in view of STA A, and STA C unnecessarily waits until STA B stops transmission. In this case, STA C may be viewed as an exposed node of STA B.

Figure 8:
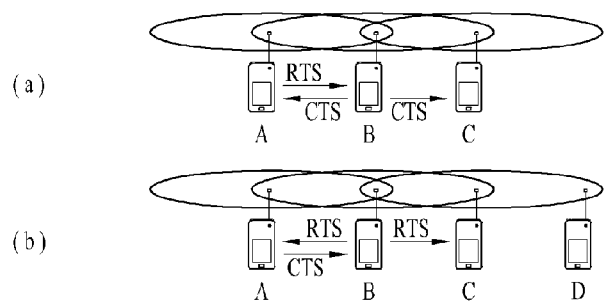
FIG. 8 illustrates RTS and CTS.

FIG. 8 illustrates RTS and CTS.

In order to efficiently use the collision avoidance mechanism in an exemplary situation as shown in FIG. 7, short-signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA that is to receive data, the STA to receive data may transmit a CTS frame to nearby STAs, thereby informing the nearby STAs that the STA is about to receive data.

FIG. 8(*a*) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(*b*) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located outside of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by switching between the sleep state (or doze state) and the awake state. The STA in the sleep state operates with minimum power and performs neither frame transmission/reception nor channel scanning.

As the time for which the STA operates in the sleep state increases, power consumption of the STA is reduced, and accordingly the STA operation duration increases. However, since transmission or reception of the frame is not allowed in the sleep state, the STA cannot unconditionally operate in the sleep state for a long time. When the STA operating in the sleep state has a frame to transmit to the AP, it may be switched to the awake state to transmit/receive the frame. On the other hand, when the AP has a frame to transmit to the STA which is in the sleep state, the STA cannot receive the frame nor recognize the presence of the frame. Accordingly, in order to recognize presence or absence of a frame to be transmitted to the STA (or in order to receive the frame if the frame is present), the STA may need to switch to the awake state according to specific periodicity.

Figure 9:
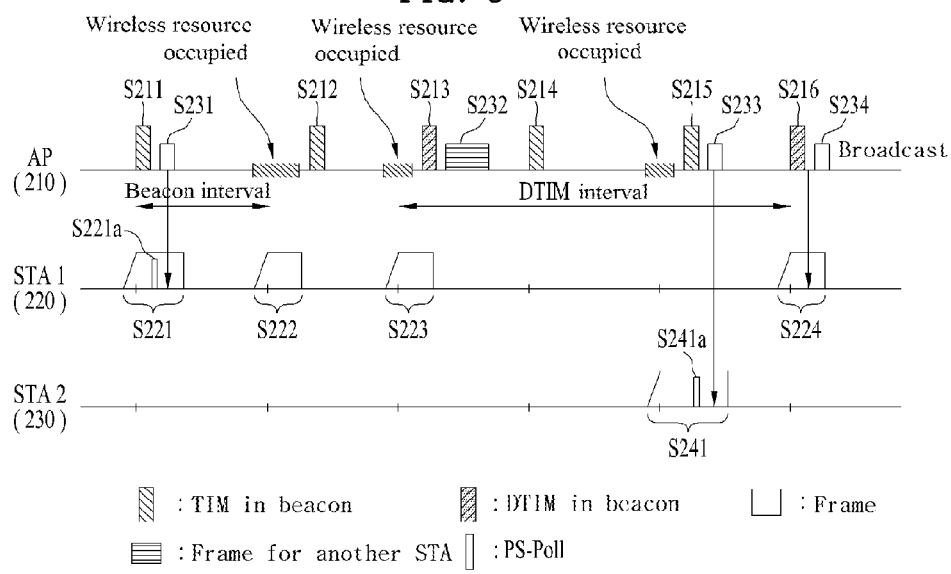
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA1 220 and STA2 222 are STAs operating in the PS mode. Each of STA1 220 and STA2 222 may switch from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save (PS)-Poll frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state and operates in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 may be switched to the awake state in accordance with the beacon interval and acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and switch back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it has failed to acquire information indicating presence of buffered traffic for STA1 220 through the previous two operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element, rather than being set to be switched between the operating states at every beacon interval. Therefore, when the AP 210 fifthly transmits the beacon frame (S215) after fourth transmission of the beacon frame (S214), STA1 220 remains in the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set for STA2 230 may have a longer period than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241*a*). The AP 210 may transmit a frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
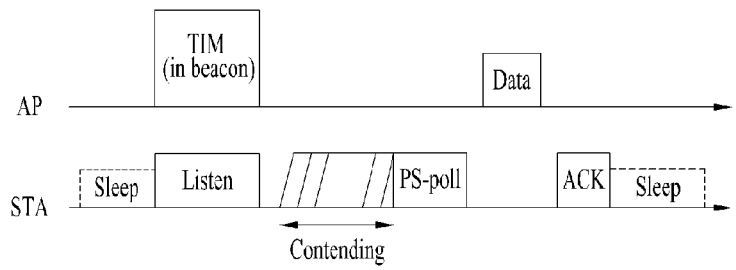
FIGS. 10 to 12 illustrate operations of a station (STA) having received a TIM in detail.
Figure 11:
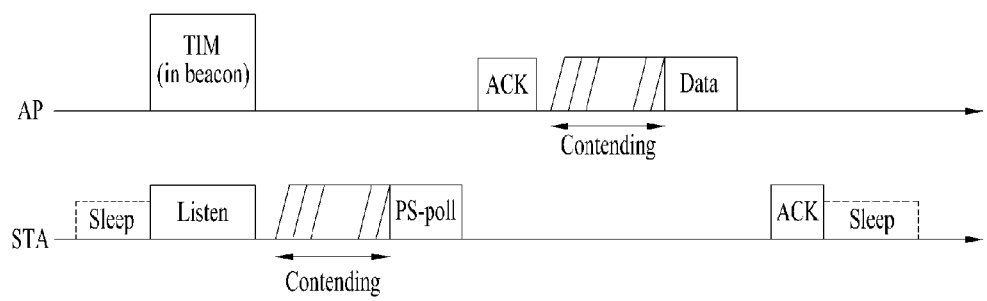
Figure 12:
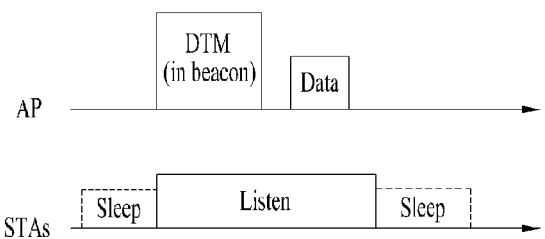

FIGS. 10 to 12 illustrate operations of an STA having received a TIM in detail.

Referring to FIG. 10, an STA is switched from the sleep state to the awake state to receive the beacon frame including a TIM from the AP. The STA may recognize presence of buffered traffic to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol illustrated in FIGS. 9 to 12, STAs may determine presence or absence of a data frame to be transmitted thereto through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bitmap other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 20.

FIG. 13(*a*) is a diagram illustrating an exemplary AID allocated on the group basis. In FIG. 13(*a*), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 13(*b*) is a diagram illustrating another exemplary AID allocated on the group basis. In FIG. 13(*b*), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 13(*b*) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging to GID 3 in a third beacon interval (or a third RAW). A TIM element used only for AIDs corresponding to GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is periodic or cyclic according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

The aforementioned group-based AID allocation scheme may also be referred to as a hierarchical structure of a TIM. That is, the entirety of an AID space may be divided into a plurality of blocks, and only STA(s) (i.e., STA(s) of a specific group) corresponding to a specific block having a value other than '0' may be allowed to perform channel access. Thereby, a large-sized TIM is divided into small-sized blocks/groups, an STA can easily maintain TIM information, and blocks/groups may be easily managed according to class, QoS or usage of the STA. While FIG. 13 exemplarily shows a 2-level hierarchy, a hierarchical TIM structure comprised of two or more levels may be configured. For example, the whole AID space may be divided into a plurality of page groups, each page group may be divided into a plurality of blocks, and each block may be divided into a plurality of sub-blocks. In this case, an extended version of the example of FIG. 13(a) may be configured such that first N1 bits in an AID bitmap represent a page ID (PID), the next N2 bits represent a block ID, the next N3 bits represent a sub-block ID, and the remaining bits represent the position of STA bits within a sub-block.

Various schemes for dividing STAs (or AIDs allocated to the STAs) into predetermined hierarchical group units and managing the same may be applied to the examples of the present invention disclosed below. However, the group-based AID allocation schemes are not limited to these examples.

U-APSD Mechanism

According to the unscheduled-automatic power save delivery (U-APSD) mechanism, in order to use a U-APSD service period (SP), an STA may inform an AP of a requested transmission duration, and the AP may transmit a frame to the STA during the SP. According to the U-APSD mechanism, the STA may receive multiple PSDUs from the AP at the same time within its own SP.

The STA may recognize through the TIM element of the beacon that the AP has data to transmit to the STA. Thereafter, the STA may transmit a trigger frame to the AP. Thereby, the STA may inform the AP that the service period (SP) of the STA has started, and request that the AP transmit the data. The AP may transmit ACK to the STA in response to the trigger frame. Thereafter, the AP may transmit RTS to the STA through contention, receive a CTS frame from the STA, and then transmit the data to the STA. Herein, the data transmitted from the AP may include at least one data frame. When the AP transmits the last data frame with the EOSP (End Of Service Period) field of the data frame set to 1, the STA may recognize this and end the SP. Thereby, the STA may transmit ACK indicating successful reception of the data to the AP. According to the U-APSD mechanism described above, the STA is allowed to start its own SP and receive data when it desires and to receive multiple data frames within one SP. Accordingly, efficient data reception may be possible.

PPDU Frame Format

A PPDU (Physical Layer Convergence Protocol (PLCP) Packet Data Unit) frame format may include a STF (Short Training Field), an LTF (Long Training Field), an SIG (SIGNAL) field, and a data field. The most basic PPDU frame format (e.g., a non-HT (High Throughput) PPDU frame format) may consist of an L-STF (Legacy-STF), an L-LTF (Legacy-LTF), an SIG field, and a data field. In addition, depending on the type of a PPDU frame format (e.g., an HT-mixed format PPDU, an HT-greenfield format PPDU, a VHT (Very High Throughput) PPDU, etc.), additional (or another type) STF, LTF, and SIG field may be included between the SIG field and the data field.

The STF is a signal for signal detection, automatic gain control (AGC), diversity selection, precise time synchronization, and the like, and the LTF is a signal for channel estimation, frequency error estimation, and the like. A combination of the STF and the LTF may be referred to as a PLCP preamble. The PLCP preamble may be a single for channel estimation and synchronization of an OFDM physical layer.

The SIG field may include a RATE field and a LENGTH field. The RATE field may contain information about data demodulation and coding rate. The LENGTH field may contain information about the length of data. Additionally, the SIG field may include a parity bit and an SIG TAIL bit.

The data field may include a SERVICE field, a PSDU (PLCP Service Data Unit), a PPDU TAIL bit. When necessary, the data field may also include a padding bit. Some bits of the SERVICE field may be used to synchronize a descrambler of a receiver. The PSDU corresponds to a MAC PDU defined in the MAC layer, and may contain data produced/used in a higher layer. The PPDU TAIL bit may be used to return the state of an encoder set to 0. The padding bit may be used to adjust the length of the data field in a predetermined unit.

A MAC PDU is defined according to various MAC frame formats, and a basic MAC frame includes a MAC header, a frame body, and an FCS (Frame Check Sequence). The MAC frame may be configured by the MAC PDU and transmitted/received through a PSDU of the data part of a PPDU frame format.

A null-data packet (NDP) frame format represents a frame format that does not include a data packet. That is, an NDP frame includes the PLCP header part (i.e., an STF, an LTF and an SIG field) of a typical PPDU format, but does not include the other part (i.e., the data field) of the typical PPDU format. The NDP frame may be referred to as a short frame format.

Slotted Channel Access Method

Figure 14:
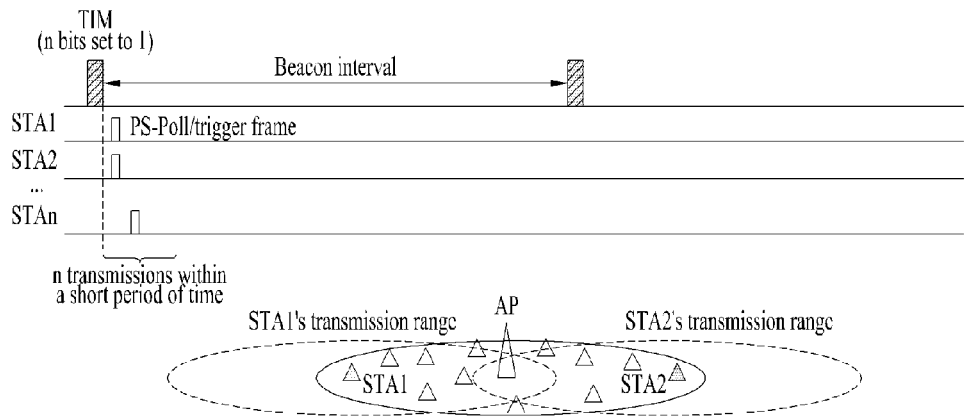
FIG. 14 illustrates the conventional TIM-based channel access method.

FIG. 14 illustrates the conventional TIM-based channel access method.

In FIG. 14, an STA corresponding to a bit set to 1 in a TIM element contained in a beacon frame may recognize presence of data to be transmitted thereto in a beacon interval, and may accordingly transmit a PS-Poll frame or a trigger frame to an AP. In the example of FIG. 14, it is assumed that a large number of STAs (e.g., at least 2007 STAs) are associated with one AP (as in, for example, an outdoor smart grid network). Herein, if n bits are set to 1 in the TIM element, n STAs (i.e., STA 1, STA 2, . . . , STA n) attempt to transmits a PS-Poll frame or a trigger frame to the AP in a short time interval after transmission of the beacon frame.

In this case, if many STAs are present at the boundary portion of the coverage of the AP, uplink transmission of an STA may be hidden from the other STAs. Moreover, if a large number of bits of the TIM element are set to 1, and transmission of PS-Poll frames or trigger frames from a large number of STAs is performed in the short time interval after beacon frame, transmission collision between STAs may increase due to the hidden node problem.

To solve this problem, the present invention proposes a slotted channel access method. Basically, the present invention proposes that a specific time interval (e.g., a RAW) allowing uplink channel access of a smaller number of STAs be set, or attempts of uplink channel access by a large number of STAs be distributed in a wide time interval in order to reduce collision and improve network performance.

Figure 15:
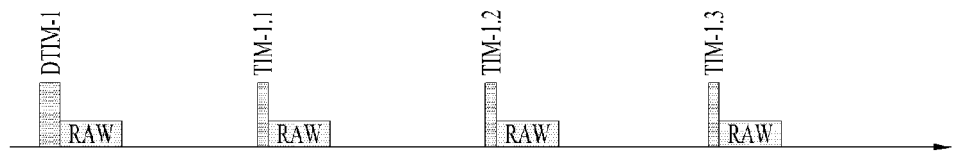
FIG. 15 illustrates the basic concept of a slotted channel access method.

FIG. 15 illustrates the basic concept of a slotted channel access method.

The AP may distribute information about an AID segment to STAs through a DTIM announcement and a TIM announcement subsequent to the DTIM announcement. A whole TIM bitmap may be divided into one or more segment blocks, and may be configured by a combination of one or more TIM elements. That is, segment blocks may correspond to a part of the whole TIM bitmap. AID segment information contained in the DTIM announcement or the TIM announcement may include, for example, a segment block offset a segment block range, a TIM for an AID segment, and information about the duration of a RAW. The segment block offset may be a start position of the AID segment, and the segment block range may represent the length thereof. Thereby, only STAs (i.e., STAs having an AID included in the AID segment) covered by the AID segment are allowed to access a channel within a RAW immediately after the DTIM or TIM announcement.

A RAW may be divided into one or more time slots. The slot duration may be differently set for each RAW. In the case in which one RAW includes a plurality of slots, the duration of the slots may be set to the same value. The information about the slot duration for each RAW may be contained in a beacon frame. An STA in the doze mode may wake up at a target beacon transmission time (TBTT) and listen to a beacon frame, thereby acquiring slot duration information in the corresponding RAW.

In this manner, an STA corresponding to an AID segment provided through a DTIM or TIM announcement may recognize that channel access thereof is allowed in a RAW immediately after the DTIM or TIM and also recognize, from the slot duration information, the slot duration in the RAW. If the STA further recognizes information about a RAW duration, it may infer or determine the number of slots included in the RAW from the slot duration information and the RAW duration information.

In this case, the STA may determine the position of a slot at which the STA needs to perform channel access (or channel access is allowed) within the RAW, based on the AID bit position thereof. The STA may acquire the AID bit position thereof from a specific information element (IE). Hereinafter, the IE will be referred to as a RAW parameter set (RPS) IE or a grouping parameter set (GrPS) IE, which represents a set of parameters which are needed for medium access restrictively allowed only for a group of STAs.

Figure 16:
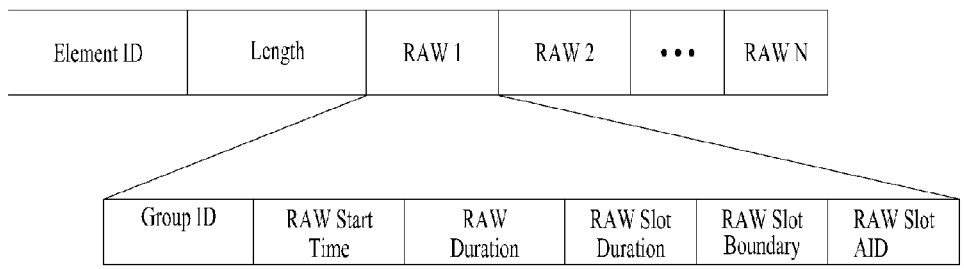
FIG. 16 illustrates an exemplary format of an RPS IE.

FIG. 16 illustrates an exemplary format of an RPS IE.

The element ID field may be set to a value indicating that an IE is an RPS IE.

The Length field may be set to a value indicating the length of the fields following the Length field. The number of subsequent RAW fields (or RAW assignment fields) may be determined according to the value of the Length field.

N RAW fields (or RAW assignment fields) may be included in an RPS IE, and each RAW field includes parameters for one RAW.

Hereinafter, a description will be given of subfields included in a RAW field shown in FIG. 16 with reference to FIG. 17.

Figure 17:
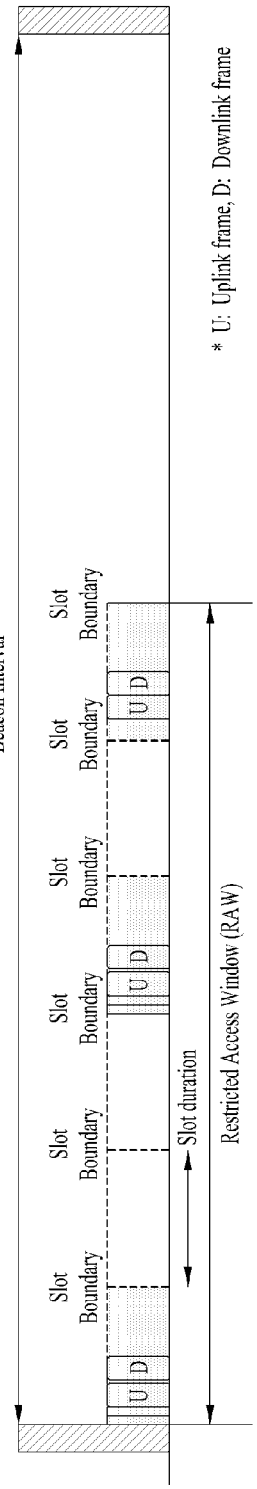
FIG. 17 illustrates configuration of a RAW according to one embodiment of the present invention.

FIG. 17 illustrates configuration of a RAW according to one embodiment of the present invention.

The Group ID field of FIG. 16 includes a segment bitmap or a block bitmap, and provides identification information about a group for which access is restrictively allowed within a corresponding RAW interval. That is, the Group ID field may contain information specifying an AID segment block (e.g., a start index, a length, an end index and the like of the AID segment block). In this sense, the Group ID field may be referred to as a RAW group field.

The RAW Start Time field of FIG. 16 may contain information about the start time at which medium access of an STA group is allowed. The RAW start time may be represented as a difference (or a duration) between the end time of beacon transmission and the time at which a RAW starts, and the unit thereof may be TU (time unit). TU may be configured in microseconds (μs). For example, TU may be defined as 1024 μs. If RAW Start Time is set to 0, the RAW may start immediately after the beacon frame ends, as shown in FIG. 17.

The RAW Duration field in FIG. 16 may contain information about the length of time (i.e., the duration) for which medium access of an STA group is allowed. The RAW duration corresponds to a difference between the RAW start time and the RAW end time, and the unit thereof may be TU.

The RAW Slot Duration field in FIG. 16 may contain information about the length of time (i.e., the duration) of each of channel access slots included in a RAW. As described above, each RAW may include a single slot, or may include a plurality of time slots. In the case in which each RAW includes a plurality of time slots, the durations of the slots included in a RAW have the same value. FIG. 17 shows a case in which six slots are defined within one RAW duration, and the durations of the six slots are set to the same value.

The RAW Slot Boundary field in FIG. 16 may be set to a value indicating whether or not a transmission opportunity (TXOP) or transmission within the TXOP is allowed to extend across (or crosses) a slot boundary. The slot boundary refers to a time which serves as a reference for distinguishing consecutive slots from each other as shown in FIG. 17. In this sense, the RAW Slot Boundary field may be referred to as a cross slot boundary field.

If a TXOP (or transmission within the TXOP) is not allowed to cross a slot boundary, the TXOP (or transmission within the TXOP) should end before the slot boundary. For example, in FIG. 17, an STA that attempts channel access (namely, transmitting an uplink frame (a PS-Poll or trigger frame)) in the first slot may receive data from the AP through a downlink frame and transmit an ACK frame to the AP in response to the data. In the case in which the TXOP (or transmission within the TXOP) is not allowed to cross a slot boundary, transmission of the ACK frame should be completed within the corresponding slot. In addition, the AP may inform of whether the above TXOP rule (i.e., a TXOP (or transmission in the TXOP) is not allowed to cross a slot boundary) is applied to each RAW. If such TXOP rule is applied, the STA may not wait as long as the probe delay when it wakes up on the slot boundary.

The RAW Slot AID field in FIG. 16 may be set to a value indicating whether or not channel access allowed only for an STA having a bit corresponding to the AID of the STA set to 1 in the TIM element. That is, the RAW Slot AID field may indicate whether channel access (i.e., transmission of an uplink frame) is allowed only for an STA corresponding to an AID for which the bit value is set to 1 in the TIM bitmap (namely, a paged STA), or is allowed regardless of whether or not the bit value is set to 1 in the TIM bitmap (namely, for paged STAs and unpaged STAs together). In this sense, the RAW Slot AID field may be referred to as an Access Restricted to Paged STAs Only field.

The fields included in the GrPS IE or the RPS IE in FIG. 16 are simply illustrative. A field configured in a different form and including substantially the same information as the fields described above is also within the scope of the present invention. In addition, the format of the proposed GrPS IE or RPS IE is not limited to the fields shown in FIG. 16. The format may include only some of the fields shown in FIG. 16, or may further include other fields which are not shown in FIG. 16.

The GrPS IE or RPS IE described above with reference to FIG. 16 may be transmitted through a beacon frame, a probe response frame, or the like. When the GrPS IE or RPS IE is transmitted through a beacon frame, the GrPS IE or RPS IE may be broadcast by the AP. When the GrPS IE or RPS IE is transmitted through a probe response frame, unicast of the GrPS IE or RPS IE may be performed by the AP.

Slot Assignment

An STA may operate in the doze (or sleep) state until a channel access slot assigned to the STA arrives. The STA may wake up on a slot boundary of the channel access slot with which the STA is assigned and start channel access in an EDCA manner (i.e., in a contention manner).

In this regard, which slot is assigned to each STA may be determined as follows.

A channel access slot for an STA may be basically determined by modulo operation of the total number of slots of a corresponding RAW and the AID of the STA. For example, an index ($i_{slot}$) of a slot in which the STA is allowed to start accessing a channel may be determined based on the following equation.

$$i_{slot} = f(AID) \bmod N_{RAW} \qquad \text{Equation 1}$$

In Equation 1, f(AID) has a value determined based on the AID of the STA. For example, f(AID) may be defined such that the value of the AID is used or only some bits of the AID are used.

In Equation 1, $N_{RAW}$ denotes the total number of slots of a RAW. $N_{RAW}$ may be calculated according to $N_{RAW} = T_{RAW}/T_{slot}$. Herein, $T_{RAW}$ has a RAW duration value, and $T_{slot}$ has a slot duration value.

In Equation 1, 'mod' represents modulo operation. A mod B stands for a remainder of division of A by B. A mod B may be expressed as A % B.

In Equation 1, a full AID of an STA may be used for f(AID). Alternatively, a partial AID may be used for f(AID) in place of the AID. Partial AID is a non-unique identifier of the STA, and may be determined by a hashing function using a part of the bits of the AID.

In the case in which Partial AID is used in calculating the slot assignment, a plurality of STAs (e.g., STAs having consecutive AID values) may be assigned so as to use the same channel access slot. For example, in Equation 1, f(AID) may be defined as being determined based on AID[a:b]. Herein, AID[a:b] represents Bit[a] to Bit[b] of the AID which is a binary number. The value of a or b may be provided to each slot by the AP.

For example, suppose that slot assignment is determined using AID[3:12]. AID[3:12] represents Bit3 to Bit12 of AID having all 14 bits (from Bit0 to Bit13). In this case, regardless of the values of Bit0, Bit1, Bit2 and Bit13 of AID, STAs for which Bit3 to Bit12 of AID are set to the same value may be allowed to perform channel access in the slot.

Figure 20:
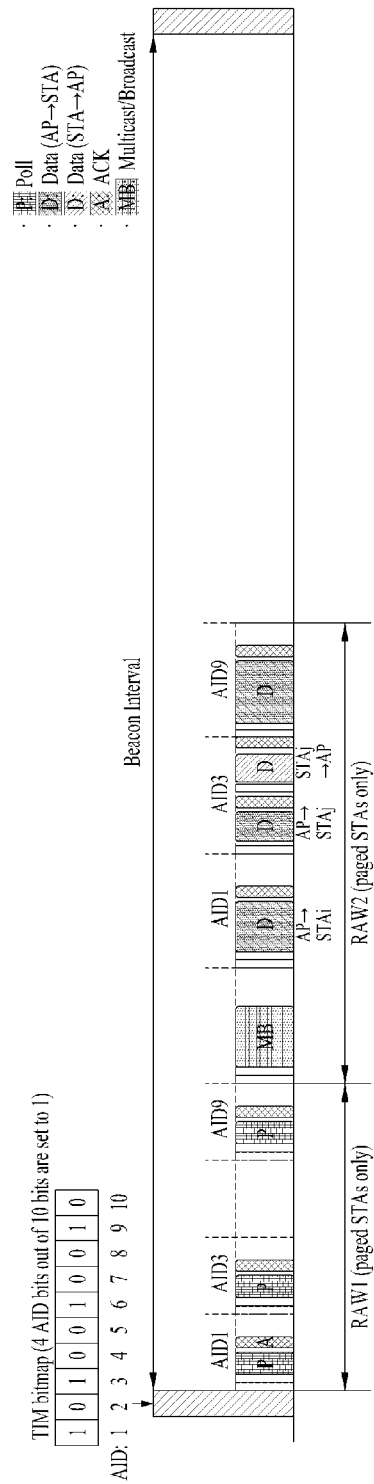
FIG. 20 illustrates multicast/broadcast slot assignment in a RAW according to one embodiment of the present invention.

Alternatively, in the case in which RAWs are restrictively assigned to STAs having AID corresponding to a bit having a bit value of 1 in the TIM element (namely, paged STAs) as shown in FIG. 20, which will be described later, f(AID) in Equation 1 may be determined based on the position index of the AID bit in the TIM element. That is, in an example as illustrated in FIG. 20, when four bits (i.e., the first, third, sixth and ninth bits) are set to 1 in the TIM bitmap, the position index of AID1 corresponding to the first bit may be determined to be 1, the position index of AID3 corresponding to the third bit may be determined to be 2, the position index of AID6 corresponding to the sixth bit may be determined to be 3, and the position index of AID9 corresponding to the ninth bit may be determined to be 4. That is, when AIDs having a bit value of 1 in the TIM element are arranged in ascending order, the order values thereof may correspond to the position indexes thereof. Accordingly, an STA having AID1 may be assigned the first slot in the RAW, another STA having AID3 may be assigned the second slot in the RAW, another STA having AID6 may be assigned the third slot in the RAW, and the other STA having AID9 may be assigned the third slot in the RAW.

On the other hand, in the case in which f(AID) is defined as using AIDs (or Partial AIDs) of STAs, f(AID) may use AIDs when RAWs are restrictively unassigned to STAs (e.g., paged STAs) having AIDs corresponding to bits set to 1 in the bitmap of the TIM element. That is, in the case in which channel access in a RAW is allowed for any STAs (e.g., all STAs regardless of whether or not the STAs are paged STAs), which slots in the RAW to be assigned to the STAs may be determined based on the AIDs of the STAs.

As described above, information about slot assignment may be additionally contained (in the form of, for example, a slot assignment field) in the GrPS or RPS IE of FIG. 16.

Examples of Slotted Channel Access

Figure 18:
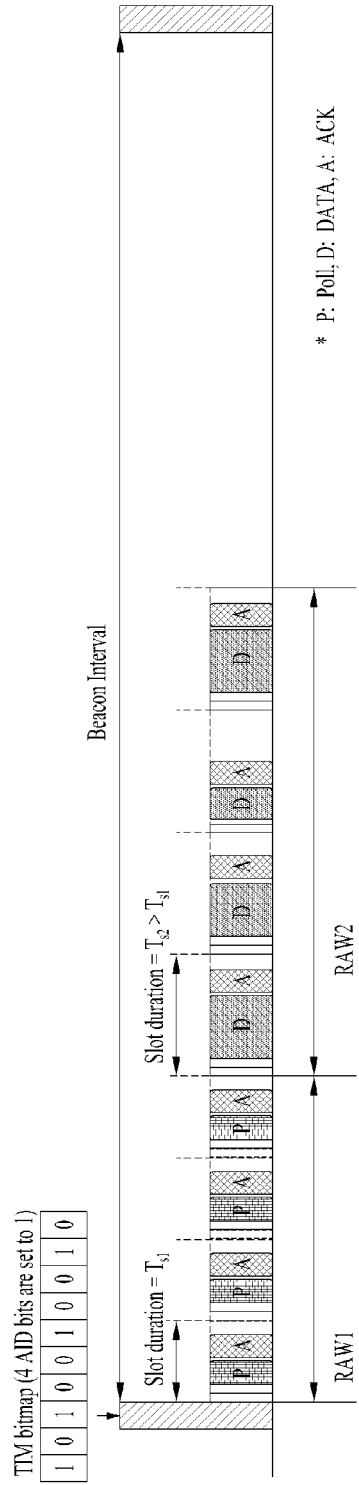
FIG. 18 illustrates slotted channel access according to one embodiment of the present invention.

FIG. 18 illustrates slotted channel access according to one embodiment of the present invention.

In the example of FIG. 18, it is assumed that the GrPS or RPS IE for RAW1 indicates that only STAs satisfying the following conditions are allowed to perform channel access in RAW1.

RAW Slot AID field: This field indicates that restriction is applied according to bit values corresponding to AIDs of STAs in a TIM element (namely, only channel access of STAs whose AID bit values are set to 1 in the TIM element (i.e., paged STAs) are allowed). In the example of FIG. 18, STAs having AIDs corresponding to the first, third, sixth and ninth bits in the TIM bitmap are allowed to access a channel in RAW 1.

RAW Slot Duration field: This field is set to $T_{s1}$ (wherein $T_{s1}$=Length of PS-Poll frame+SIFS+Length of ACK frame, or Ts1=Length of Null Data Trigger frame+SIFS+Length of ACK frame).

RAW Slot Boundary field: This field indicates that a TXOP (or transmission within the TXOP) is not allowed to cross a slot boundary.

With the configurations as above, RAW1 of FIG. 18 may be used only for a PS-Poll or null-data trigger frame.

In the example of FIG. 18, it is assumed that the GrPS or RPS IE for RAW2 indicates that only STAs satisfying the following conditions are allowed to perform channel access in RAW2.

RAW Slot AID field: This field indicates that restriction is applied according to bit values corresponding to AIDs of STAs in a TIM element (namely, only channel access of STAs whose AID bit values are set to 1 in the TIM element (i.e., paged STAs) are allowed). In the example of FIG. 18, STAs having AIDs corresponding to the first, third, sixth and ninth bits in the TIM bitmap are allowed to access a channel in RAW2.

RAW Slot Duration field: This field is set to $T_{s2}$ (wherein $T_{s2} \geq$ Length of data frame+SIFS+Length of ACK frame).

RAW Slot Boundary field: This field indicates that a TXOP (or transmission within the TXOP) is not allowed to cross a slot boundary.

With the configurations as above, RAW2 of FIG. 18 may be used by the AP to transmit a data frame to STAs having AIDs corresponding to bits in the TIM bitmap which have 1 as bit values thereof.

Figure 19:
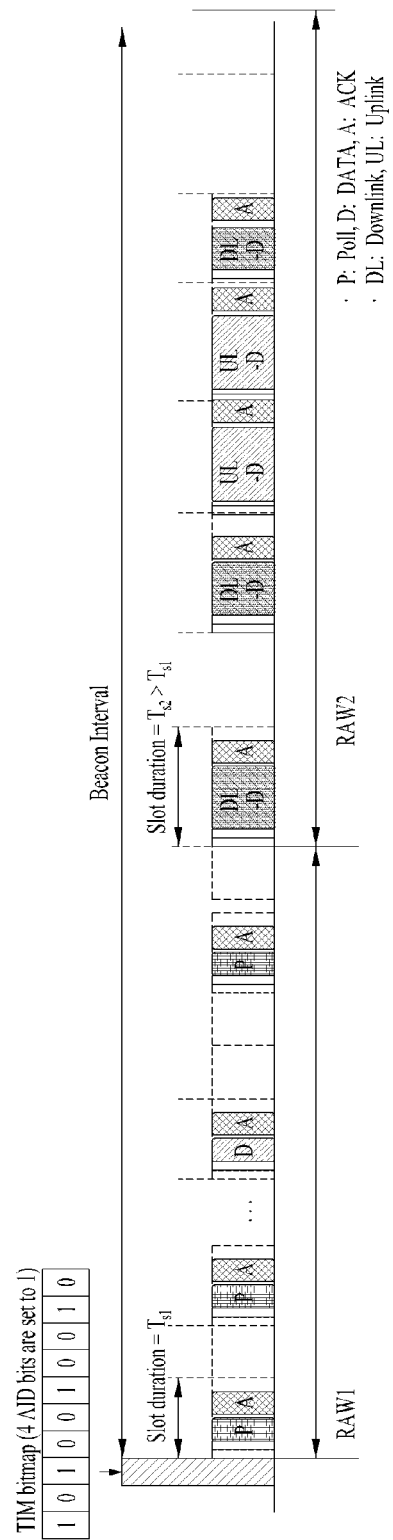
FIG. 19 illustrates slotted channel access according to another embodiment of the present invention.

FIG. 19 illustrates slotted channel access according to another embodiment of the present invention.

In the example of FIG. 19, it is assumed that the GrPS or RPS IE for RAW1 indicates that only STAs satisfying the following conditions are allowed to perform channel access in RAW1.

RAW Slot AID field: This field indicates that restriction according to bit values corresponding to AIDs of STAs in a TIM element is not applied (namely, channel access of all STAs is allowed in RAW1 regardless of whether or not the AID bit values of the STAs are set to 1 in the TIM element (i.e., whether or not the STAs are paged)). In FIG. 19, STAs having AIDs corresponding to the first, third, sixth and ninth bits in the TIM bitmap and the other STAs are all allowed to access a channel in RAW1.

RAW Slot Duration field: This field is set to $T_{s1}$ (wherein $T_{s1}$=Length of PS-Poll frame+SIFS+Length of ACK frame, or Ts1=Length of Null Data Trigger frame+SIFS+Length of ACK frame).

RAW Slot Boundary field: This field indicates that a TXOP (or transmission within the TXOP) is not allowed to cross a slot boundary.

With the configurations as above, RAW1 of FIG. 19 may be used for a PS-Poll or null-data trigger frame of any STA or any short control frames.

In the example of FIG. 19, it is assumed that the GrPS or RPS IE for RAW2 indicates that only STAs satisfying the following conditions are allowed to perform channel access in RAW2.

RAW Slot AID field: This field indicates that restriction according to bit values corresponding to AIDs of STAs in a TIM element is not applied (namely, channel access of all STAs is allowed in RAW2 regardless of whether or not the AID bit values of the STAs are set to 1 in the TIM element (i.e., whether or not the STAs are paged)). In FIG. 19, STAs having AIDs corresponding to the first, third, sixth and ninth bits in the TIM bitmap and the other STAs are all allowed to access a channel in RAW2.

RAW Slot Duration field: This field is set to $T_{s2}$ (wherein $T_{s2} \geq$ Length of data frame+SIFS+Length of ACK frame).

RAW Slot Boundary field: This field indicates that a TXOP (or transmission within the TXOP) is not allowed to cross a slot boundary.

With the configurations as above, RAW2 of FIG. 19 may be used by the AP or any STA to transmit a data frame to any STA or the AP.

Multicast/Broadcast Transmission Slot

When a RAW is divided into one or more time slot, the first one or more slots or the last one or more slots in the RAW may be assigned for multicast or broadcast. STAs should be maintained in the awake state in a slot assigned for multicast/broadcast within the RAW.

To this end, a GrPS or RPS IE that defines parameters for a RAW and a channel access slot may further include a RAW Multicast/Broadcast Slot Duration field.

The RAW Multicast/Broadcast Slot Duration field may be used to inform an STA group of information about the duration of allowed multicast/broadcast medium access.

FIG. 20 illustrates multicast/broadcast slot assignment in a RAW according to one embodiment of the present invention.

In the example of FIG. 20, the first slot of RAW2 is assigned for multicast/broadcast, but the AP may transmit a multicast/broadcast frame in the first slot. All STAs are in the awake state in the first slot.

In addition, the multicast/broadcast slot may also be used for re-configuration of slot assignment of RAWs.

For example, in FIG. 20, through a TIM element and a GrPS element (or RPS element) of a beacon frame, RAW1 and RAW2 may be set to allow channel access only for specific STAs (e.g., paged STAs), and the slots to be assigned to the specific STAs may be determined. For example, as described above, an STA having AID1 may be assigned to the first slot, another STA having AID3 may be assigned to the second slot, another STA having AID6 may be assigned to the third slot, and the other STA having AID9 may be assigned to the fourth slot.

STAs paged in RAW1 (i.e., STAs for which AID bits are set to 1 in the TIM bitmap of a beacon frame) may make a request to the AP for transmission of a downlink frame buffered in the AP by transmitting a PS-Poll frame or trigger frame.

Herein, it is assumed that the STA having AID6 is assigned with the third slot of RAW1, but it fails to switch from the doze state to the awake state on a slot boundary from which the third slot begins and thus fails to transmit a PS-Poll frame or trigger frame in the third slot, as shown in FIG. 20.

The AP has assigned a slot (e.g., the third slot) in RAW2 to transmit a downlink frame to the STA having AID6. However, since the AP has failed to receive a PS-Poll/trigger frame from the STA having AID6 in RAW 1, the AP can expect that the STA will fail to transmit the PS-Poll/trigger frame in the slot of the RAW2 if slot assignment to the STA having AID6 is left unchanged. Accordingly, the AP needs to collect the slot assigned for the STA having AID6.

To this end, the AP may transmit a RAW announcement frame in the first slot of RAW2 which is assigned as the multicast/broadcast slot. The RAW announcement frame includes a GrPS IE (or an RPS IE). That is, the AP may renew the configurations (e.g., RAW duration, RAW slot duration, slot assignment, etc.) of the next RAW (i.e., RAW2) based on whether or not PS-Poll/trigger frames are received from the STAs in RAW1. That is, information about resource allocation in the RAW may be transmitted even through a frame other than the beacon frame at the beginning of the RAW.

In this case, slot assignment for the STA is determined based on the slots other than the multicast/broadcast slot among all the assignable slots (i.e., all the slots included in the RAW). For example, in FIG. 20, slot assignment of the three slots (i.e., the second, third and fourth slots) to the STA may be determined with the first slot of RAW2 excluded from slot assignment for the STA. The slot assignment information may be included in the RAW announcement frame (i.e., the frame containing information about resource allocation in the RAW) at the beginning of the RAW, and a slot assignment scheme may be determined as in the case of the aforementioned scheme.

Figure 21:
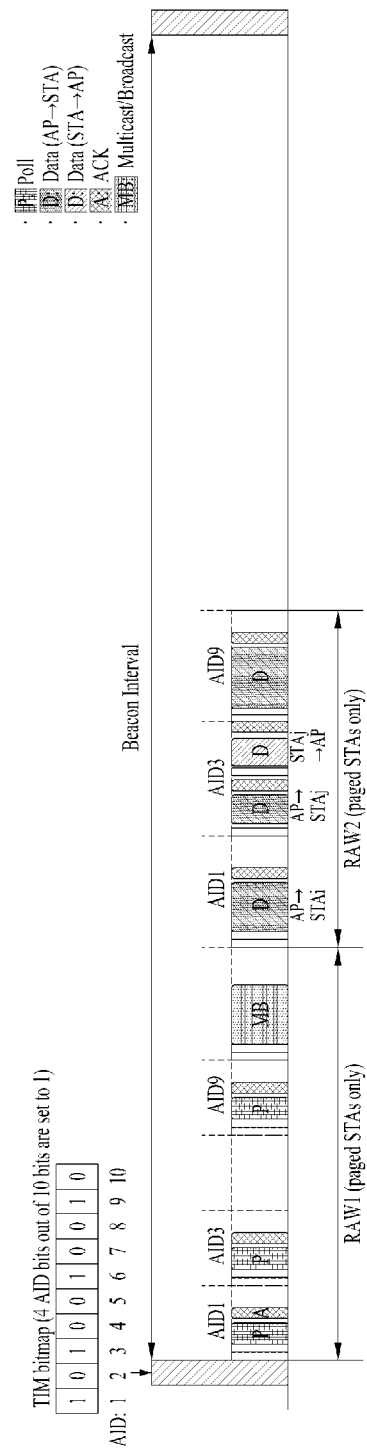
FIG. 21 illustrates multicast/broadcast slot assignment in a RAW according to another embodiment of the present invention.

FIG. 21 illustrates multicast/broadcast slot assignment in a RAW according to another embodiment of the present invention.

While the example of FIG. 20 assumes that the multicast/broadcast slot is always positioned at the beginning of a RAW, FIG. 21 illustrates a case in which the multicast/broadcast slot may be the first slot of the RAW or another slot. In the example of FIG. 21, the multicast/broadcast slot is positioned at the last part of the RAW. In this case, when the GrPS IE (or RPS IE) defines a RAW multicast/broadcast slot duration field, a field containing information indicating the position of the multicast/broadcast slot (i.e., RAW Multicast/Broadcast Slot Offset) may be included.

For example, if an N-th slot of RAW1 is assigned as the multicast/broadcast slot, the RAW Multicast/Broadcast Slot Offset field may be set to N. If the multicast/broadcast slot is positioned at the beginning of the RAW, the RAW Multicast/Broadcast Slot Offset field may be set to 0. If the multicast/broadcast slot is positioned at the last part of the RAW, the RAW Multicast/Broadcast Slot Offset field may be set to 255.

Figure 22:
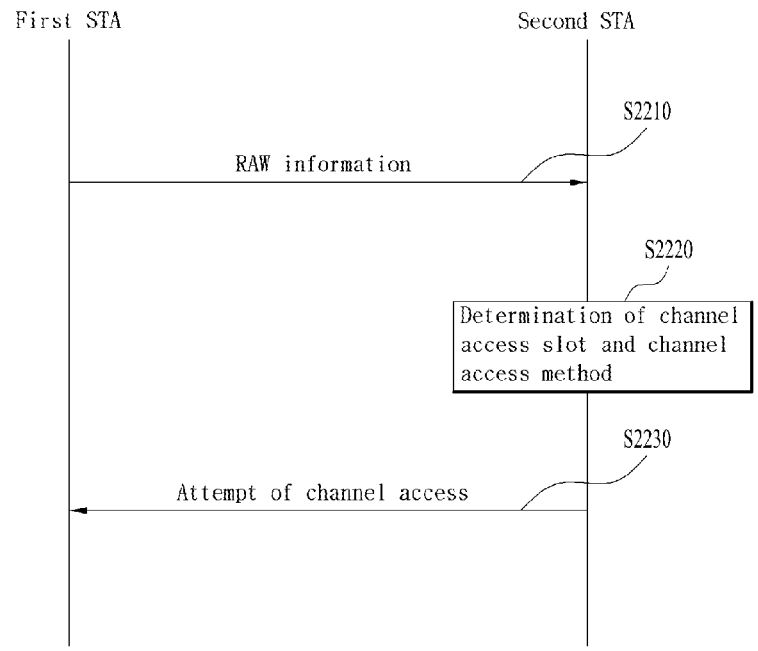
FIG. 22 illustrates a channel access method according to one embodiment of the present invention.

FIG. 22 illustrates a channel access method according to one embodiment of the present invention.

In step S2210, RAW information from a first STA (e.g., an AP) may be received by a second STA (e.g., a non-AP STA). The RAW information may be a GrPS element or RPS element described above and may be transmitted through a beacon frame.

In step S2220, based on the RAW information, the second STA may determine whether it belongs to a group for which channel access is allowed in a RAW, and determine the position and length in time (i.e., the RAW start time and duration) of the RAW in which channel access of the second STA is allowed, and the position and length of a slot of the RAW in which channel access of the second STA is allowed. The second STA may also determine a channel access method depending on whether or not transmission crossing a slot boundary is allowed when transmission is performed within the RAW by acquiring a TXOP, and whether or not only paged STAs are allowed to perform channel access.

In step S2230, the second STA may attempt channel access. That is, the second STA may access a channel based on EDCA (i.e., in a contention manner).

In implementing the channel access method described with reference to FIG. 22, details of the various embodiments of the present invention described above may be independently applied or two or more embodiments may be simultaneously applied.

Figure 23:
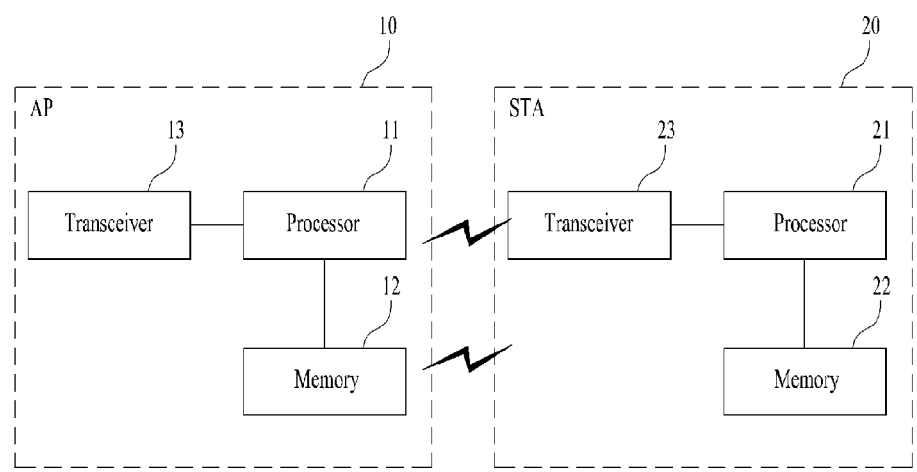
FIG. 23 is a block diagram illustrating a radio frequency apparatus according to one embodiment of the present invention.

FIG. 23 is a block diagram illustrating a radio frequency device according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive a radio frequency signal and implement a physical layer according to an IEEE 802 system. The processors 11 and 21 may be connected to the transceivers 13 and 21 to implement a physical layer and/or a MAC layer according to an IEEE 802 system. The processors 11 and 21 may be configured to perform various operations according to the various embodiments of the present invention described above. In addition, modules to perform operations of an AP and an STA according to the various embodiments of the present invention described above may be stored in the memories 12 and 22 and executed by the processors 11 and 21. The memories 12 and 22 may be contained in the processors 11 and 21 or may be installed at the exterior of the processors 11 and 21 and connected to the processors 11 and 21 by a well-known means.

Constituents of the AP and the STA may be implemented such that details of the various embodiments of the present invention described above are independently applied or two or more embodiments are simultaneously applied. For clarity, redundant descriptions have been omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

As described above, various embodiments of the present invention have been described through examples applied to an IEEE 802.11 system, but they may also be applied to various wireless communication systems in the same manner.

The invention claimed is:

1. A method for performing channel access in at least one station (STA) of a wireless communication system, comprising:
receiving, from an access point (AP), a first frame containing a traffic indication map (TIM) element and a restricted access window parameter set (RPS) element;
determining a restricted access window (RAW) allowing channel access of the STA based on the RPS element; and
transmitting a second frame to the AP within the determined RAW,
wherein:
the RAW comprises at least one slot; and
the RPS element comprises at least one RAW assignment field, each of the at least one RAW assignment field comprising a first field indicating a slot duration and a second field indicating whether or not the channel is only accessed by paged STAs, and
wherein an index of a slot in which the STA is allowed to start accessing the channel is determined based on an association identifier (AID) of the STA and the number of slots in the RAW,
wherein the index of the slot is determined based on a position index of an AID bit in the TIM element when the second field indicates that the channel is only accessed by the paged STAs.

2. The method according to claim 1, wherein the index (islot) of the slot is determined based on the following equation:

$i\_slot = f(AID) \bmod N\_RAW$, wherein:
f(AID) has a value determined based on the AID;
NRAW denotes the number of slots; and
mod denotes modulo operation.

3. The method according to claim 2, wherein NRAW=TRAW/Tslot, wherein TRAW is determined by a value of the RAW duration field, and Tslot is determined by the slot duration field.

4. The method according to claim 1, wherein, when the second field does not indicate that the channel is only accessed by the paged STAs, f(AID) is determined based on the AID of the STA.

5. The method according to claim 1, wherein the slot duration field indicates a duration of the at least one slot having the same value within the RAW.

6. The method according to claim 1, wherein each of the at least one RAW assignment field further comprises a RAW group field and a RAW start time field.

7. The method according to claim 6, wherein the RAW group field indicates AIDs of STAs allowed to perform channel access within the RAW.

8. The method according to claim 6, wherein whether or not the STA belongs to a group indicated by the RAW group field is determined.

9. The method according to claim 1, wherein each of the at least one RAW assignment field further comprises a cross slot boundary field.

10. The method according to claim 9, wherein the cross slot boundary field indicates whether or not the transmission by the STA is allowed to cross a slot boundary.

11. The method according to claim 1, wherein the STA operates in a doze state before a time, and switches to an awake state at the time, the channel access within the RAW being allowed at the time.

12. The method according to claim 1, wherein the first frame is a beacon frame, and the second frame is a power save (PS)-Poll frame or a trigger frame.

13. The method according to claim 1, wherein the second frame is transmitted within the RAW based on enhanced distributed channel access (EDCA).

14. A station (STA) for performing channel access in a wireless communication system, comprising:
a transceiver; and
a processor that:
controls the transceiver to receive, from an access point, a first frame containing a traffic indication map (TIM) element and a restricted access window parameter set (RPS) element;
determines a restricted access window (RAW) allowing channel access of the STA based on the RPS element; and
controls the transceiver to transmit a second frame to an access point (AP) within the determined RAW,
wherein:
the RAW comprises at least one slot; and
the RPS element comprises at least one RAW assignment field, each of the at least one RAW assignment field comprising a first field indicating a slot duration and a second field indicating whether or not the channel is only accessed by paged STAs; and
wherein an index of a slot in which the STA is allowed to start accessing the channel is determined based on an association identifier (AID) of the STA and the number of slots in the RAW,
wherein the index of the slot is determined based on a position index of an AID bit in the TIM element when the second field indicates that the channel is only accessed by the paged STAs.

* * * * *